US010647102B2

(12) United States Patent
Filipovic et al.

(10) Patent No.: US 10,647,102 B2
(45) Date of Patent: May 12, 2020

(54) SYSTEM AND METHOD FOR REMOVAL OF A LAYER

(71) Applicant: General Electric Company, Schenectady, NY (US)

(72) Inventors: Dragan Filipovic, Garching bei München (DE); Martin Petersen, Poing (DE); Sultan Shair, Garching bei München (DE); Stefaan Guido Van Nieuwenhove, Hohenkammer (DE); Shatil Sinha, Clifton Park, NY (US); Wendy Wen-Ling Lin, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 370 days.

(21) Appl. No.: 15/642,604

(22) Filed: Jul. 6, 2017

(65) Prior Publication Data
US 2019/0009513 A1    Jan. 10, 2019

(51) Int. Cl.
*B32B 43/00* (2006.01)

(52) U.S. Cl.
CPC ...... *B32B 43/006* (2013.01); *B32B 2305/076* (2013.01)

(58) Field of Classification Search
CPC ............ B32B 43/006; B32B 2305/076; B65B 69/0033
See application file for complete search history.

(56) References Cited

U.S. PATENT DOCUMENTS 6,360,804 B1    3/2002    Field et al.
6,872,229 B2    3/2005    Tsujimoto
(Continued)

FOREIGN PATENT DOCUMENTS

DE    202006013619 U1    11/2006
JP          3946846 B2     7/2007
(Continued)

OTHER PUBLICATIONS

Kim et al., "A Comparison of Adhesive Tape-Separation Methods from Surfaces; Dipping in Liquid Nitrogen, Liquid Nitrogen Spray and an Adhesive Neutralizer Method", Journal of Forensic Research, Nov. 6, 2016.
(Continued)

*Primary Examiner* — Christopher T Schatz
*Assistant Examiner* — Cynthia L Schaller
(74) *Attorney, Agent, or Firm* — Paul Diconza (57) ABSTRACT

A system includes a gripper device to grasp a disposable proxy. The gripper device is moveable to position a pressure sensitive adhesive in contact with the disposable proxy and apply a pressure force to adhere the pressure sensitive adhesive to the disposable proxy. The gripper device is moveable to position the pressure sensitive adhesive in contact with an edge portion of a first layer of a plurality of layers and apply a pressure force to adhere the pressure sensitive adhesive to the edge portion of the first layer. The system further includes a cutting device moveable to apply a cutting force to separate a sacrificial corner portion of the first layer proximate the edge portion of the first layer from a remaining portion of the first layer. The gripper device is movable to peel the remaining portion of the first layer from one or more remaining layers of the plurality of layers.

19 Claims, 10 Drawing Sheets

(56) References Cited

U.S. PATENT DOCUMENTS

| | | | |
|---|---|---|---|
| 7,323,077 B2 | 1/2008 | Pennerath | |
| 9,142,805 B2 | 9/2015 | Yu et al. | |
| 2008/0011420 A1* | 1/2008 | Yoshizawa | B65H 41/00 |
| | | | 156/715 |
| 2014/0238617 A1* | 8/2014 | Shair | B32B 43/006 |
| | | | 156/708 |
| 2017/0158449 A1* | 6/2017 | Kramer | B65H 18/10 |

FOREIGN PATENT DOCUMENTS

| | | | |
|---|---|---|---|
| JP | 2009233988 A | 10/2009 | |
| JP | 5060402 B2 | 10/2012 | |
| KR | 101330403 B1 | 11/2013 | |

OTHER PUBLICATIONS

Shair, S. et al., "System and Method for Removal of a Layer", U.S. Appl. No. 13/779,883, filed Feb. 28, 2013.

* cited by examiner

SYSTEM AND METHOD FOR REMOVAL OF A LAYER

BACKGROUND

The disclosure relates generally to a layer removal system, and more particularly to a system and method for removing protective layers from a prepreg material, or an adhesive material, for example.

Generally, a pre-impregnated material (also referred to as a "prepreg") is used in composite manufacturing applications, for example building a composite laminate. The prepreg material typically includes a fabric impregnated with a thermosetting resin, which can either be sandwiched between two layers of protective layers or have a single layer of protective layer. An adhesive material that is often used in parallel with the composite laminate may also be sandwiched between protective layers. The protective layers protect the material from environmental factors, such as moisture and debris, and furthermore provide dimensional stability during handling. For a single layer of protective layer, the base fabric can be laid directly onto a preforming mold or the composite laminate, and then the protective layer may be removed from the base fabric material. In some other cases, the protective layer is peeled and removed entirely from the base fabric material or the sandwiched fabric and then the base fabric is laid on the composite laminate or the preforming mold. The protective layer is typically formed of a polyfilm or paper.

Conventionally, removing the protective layer from the prepreg or adhesive material is done by a manual process. The skill of the individual is used to ensure that the protective layer is removed properly and swiftly. Often, in the manual process, sharp objects are used for releasing or peeling the protective layer, and subsequently remove the protective layer entirely from the prepreg or adhesive material. Such a process of peeling the protective layer is tedious and may cause damage to the material, and may not be efficient to remove the protective layer from the material. Additionally, the manual process of removing the protective layer may lack repeatability, and reliability.

Other means of removing the protective layer include the use of automated systems, but these systems have proved a challenge for many years which has not been solved in a way that provides expected reliability of automated processes.

Thus there is a need for an improved system and method for efficiently peeling and removing a layer from a material.

BRIEF DESCRIPTION

In accordance with one exemplary embodiment, a system for separating one layer from another layer is disclosed. The system includes a gripper device configured to grasp a disposable proxy, and a support device, wherein the plurality of layers are held by a support surface of the support device. The gripper device is moveable to position a pressure sensitive adhesive in contact with the disposable proxy and apply a pressure force to adhere the pressure sensitive adhesive to the disposable proxy and remove the pressure sensitive device from a dispenser. The gripper device is further moveable to position the pressure sensitive adhesive in contact with an edge portion of a first layer of a plurality of layers and apply a pressure force to adhere the pressure sensitive adhesive to the edge portion of the first layer. The gripper device is further movable to peel the e first layer entirely from the one or more remaining layers of the plurality of layers.

In accordance with another exemplary embodiment, a method for separating one layer from another layer is disclosed. The method includes holding a plurality of layers by a support surface of a support device, grasping a disposable proxy in a gripper device, adhering a first side of a pressure sensitive adhesive to the disposable proxy, adhering a second side of the pressure sensitive adhesive to an edge portion of a first layer of the plurality of layers, applying a cutting force with a cutting device to separate a sacrificial corner portion of the first layer proximate the edge portion of the first layer from a remaining portion of the first layer and moving the gripper device to peel the remaining portion of the first layer entirely from one or more remaining layers of the plurality of layers.

In with yet another exemplary embodiment, a method for separating one layer from another layer is disclosed. The method includes holding a plurality of layers by a support surface of a support device, grasping a disposable proxy in a gripper device, adhering a first side of a pressure sensitive adhesive to the disposable proxy, adhering a second side of the pressure sensitive adhesive to an edge portion of a first layer of the plurality of layers, applying a cutting force with a cutting device to separate a sacrificial corner portion of the first layer proximate the edge portion of the first layer from a remaining portion of the first layer; moving the gripper device along at least one axis to peel the remaining portion of the first layer entirely from one or more remaining layers of the plurality of layers and sensing via a plurality of sensors at least one of contacting of the first layer by the pressure sensitive adhesive adhered to the disposable proxy, contacting of the first layer by the cutting device, applying of the cutting force to the first layer to separate the sacrificial corner portion of the first layer from the remaining portion of the first layer, holding of the peeled remaining portion of the first layer by the pressure sensitive adhesive adhered to the disposable proxy gripped in the gripper device, and removal of the first layer entirely from the one or more remaining layers of the plurality of layers.

These and other features and improvements of the present application will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings in which.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

By way of background, embodiments of the present application may be used in conjunction with a non-rigid composite ply material, such as a prepreg, having a protective layer for removal. It will be understood by those skilled in the art that the present invention is not limited to the use of such materials and may be used in conjunction with adhesive materials, or any other material having a protective layer for removal. The examples provided are not meant to be limiting to the type of material.

Embodiments discussed herein disclose a system and method for separating of materials and protective films, layers or papers, which are adhered to each other. More particularly, certain embodiments of the present disclosure disclose a system and method for removing a first layer adhered to one or more layers of a plurality of layers. The method includes applying an adhesive material to a proxy held within a gripper device, adhering the adhesive material to an edge portion of a first layer of a plurality of layers, applying a cutting pressure to cut through the first layer so as to separate a sacrificial corner portion of the first layer from a remaining portion of the first layer and peeling, beginning at the edge portion, the first layer from the one or more remaining layers of the plurality of layers by moving the gripper device relative to the support device. The method further includes removing the first layer entirely from the one or more remaining layers of the plurality of layers by moving the gripper device along at least one axis. In accordance with certain embodiments, the exemplary method may be an automated method within a manual process or a completely automated robotic process. In a specific embodiment, a user may activate a protective layer removal process via an interface or a start/stop button.

Figure 1:
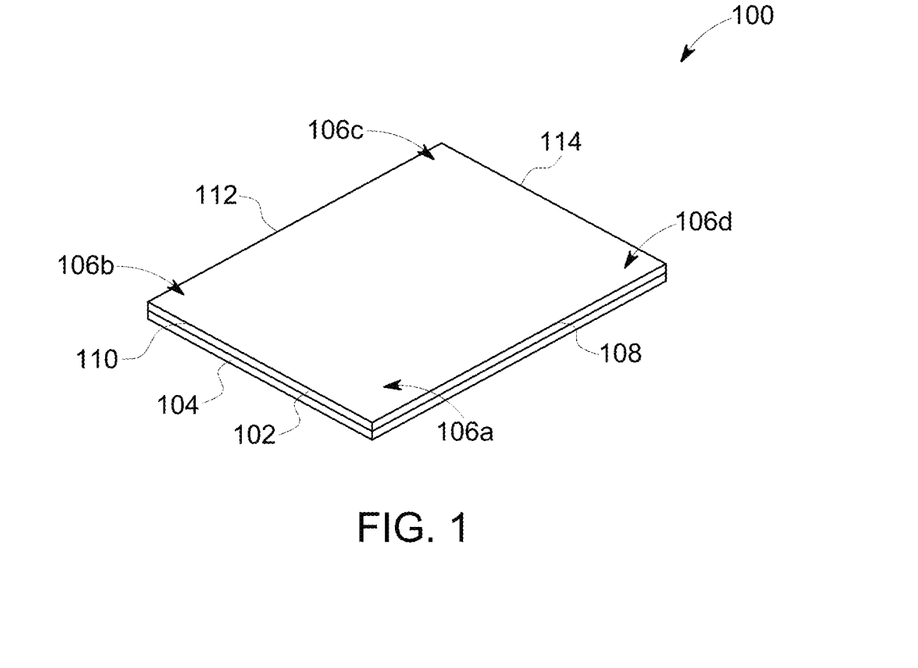
FIG. 1 is a illustration of a plurality of layers, in accordance with one or more embodiments shown or described herein.
Figure 2:
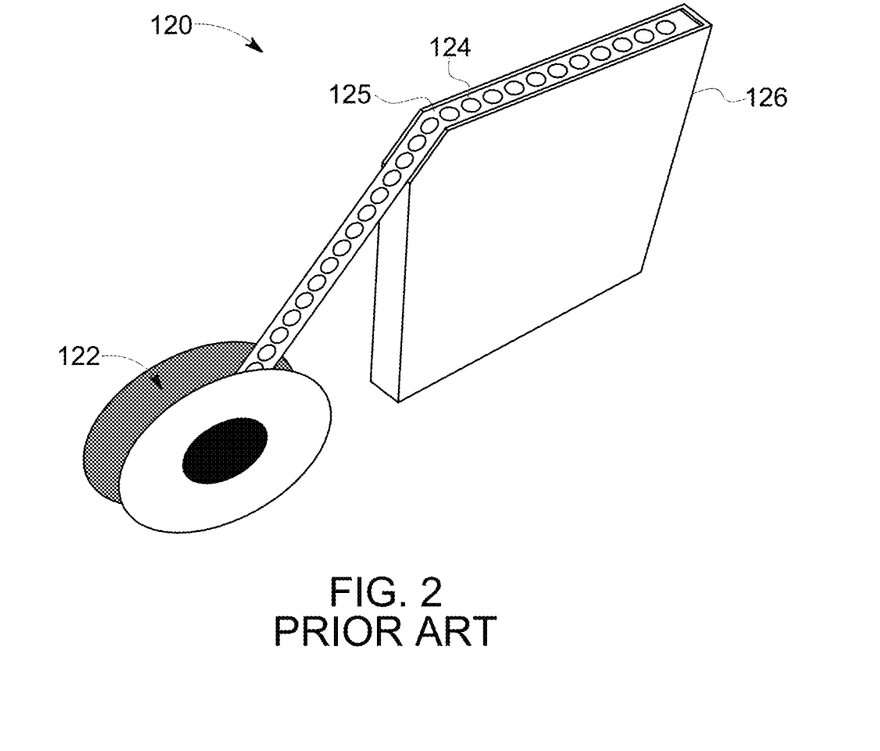
FIG. 2 is an illustration of pressure sensitive adhesive dispensing system for use in the system and method for removal of a layer, in accordance with one or more embodiments shown or described herein.
Figure 9:
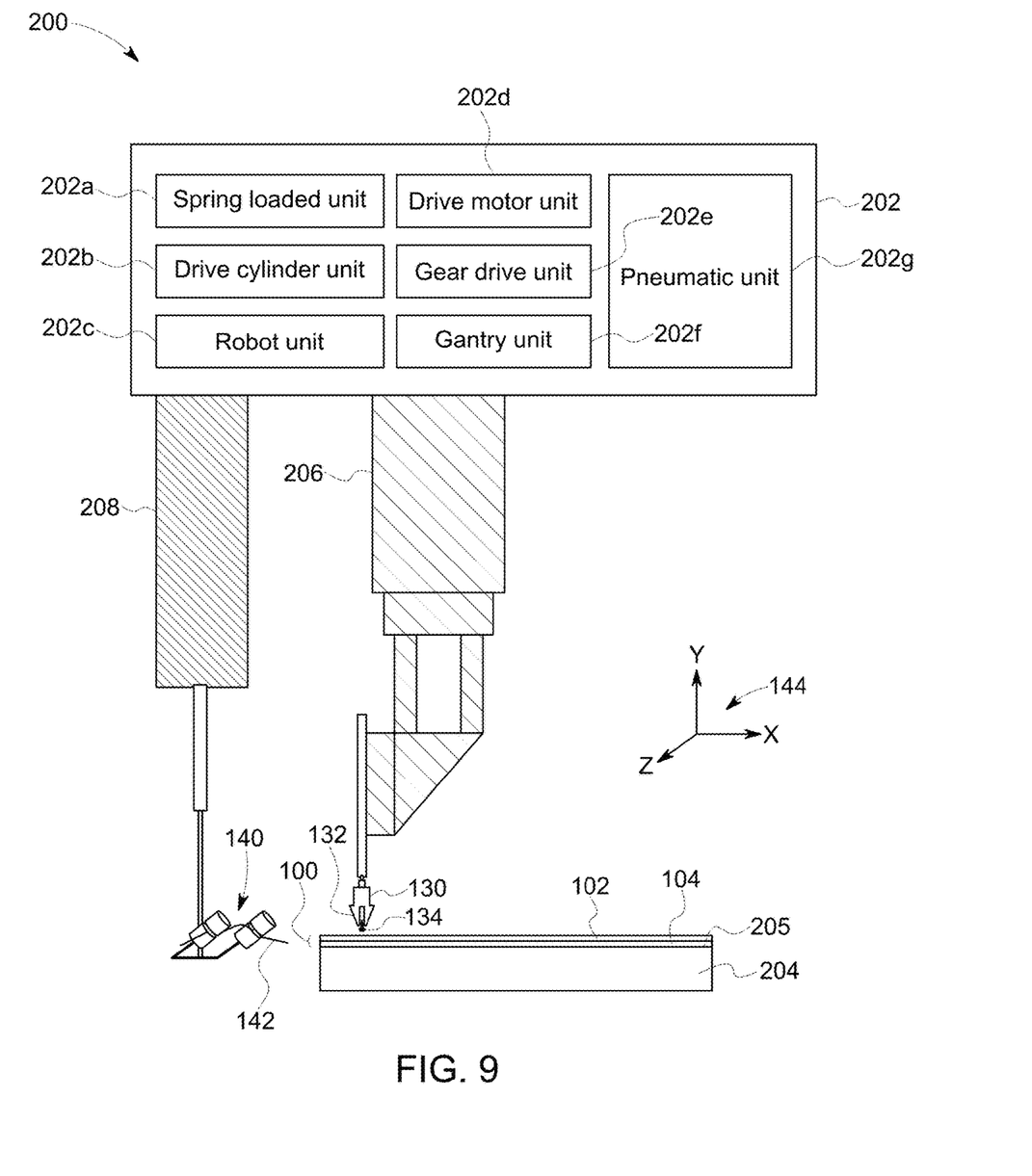
FIG. 9 is a simplified cross-sectional view of a system for removal of a layer prior to separation of a sacrificial corner portion from a remaining portion of the first layer, in accordance with one or more embodiments shown or described herein.
Figure 10:
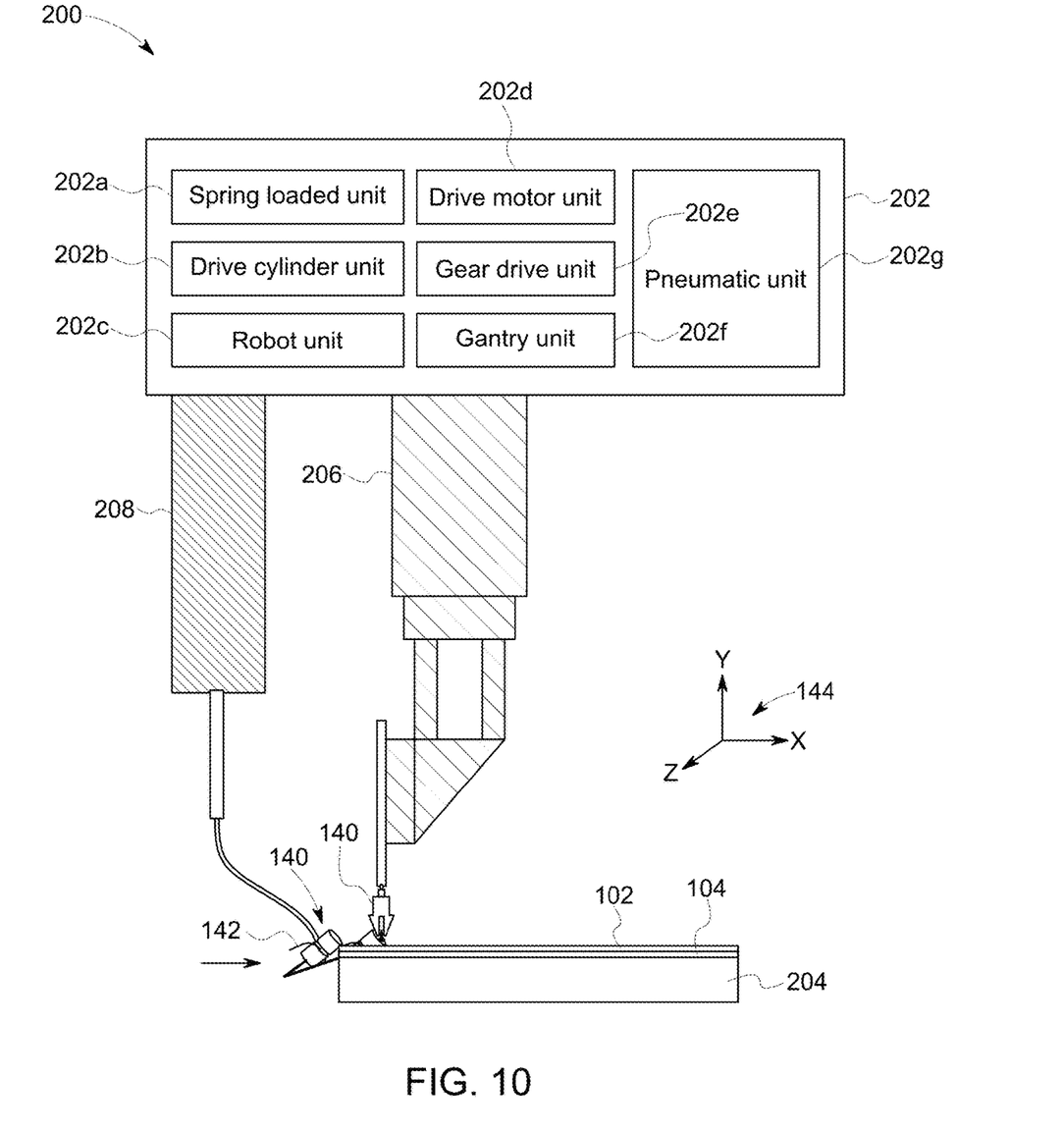
FIG. 10 is a simplified cross-sectional view of the system of FIG. 9 during separation of a sacrificial corner portion from a remaining portion of the first layer, in accordance with one or more embodiments shown or described herein.
Figure 11:
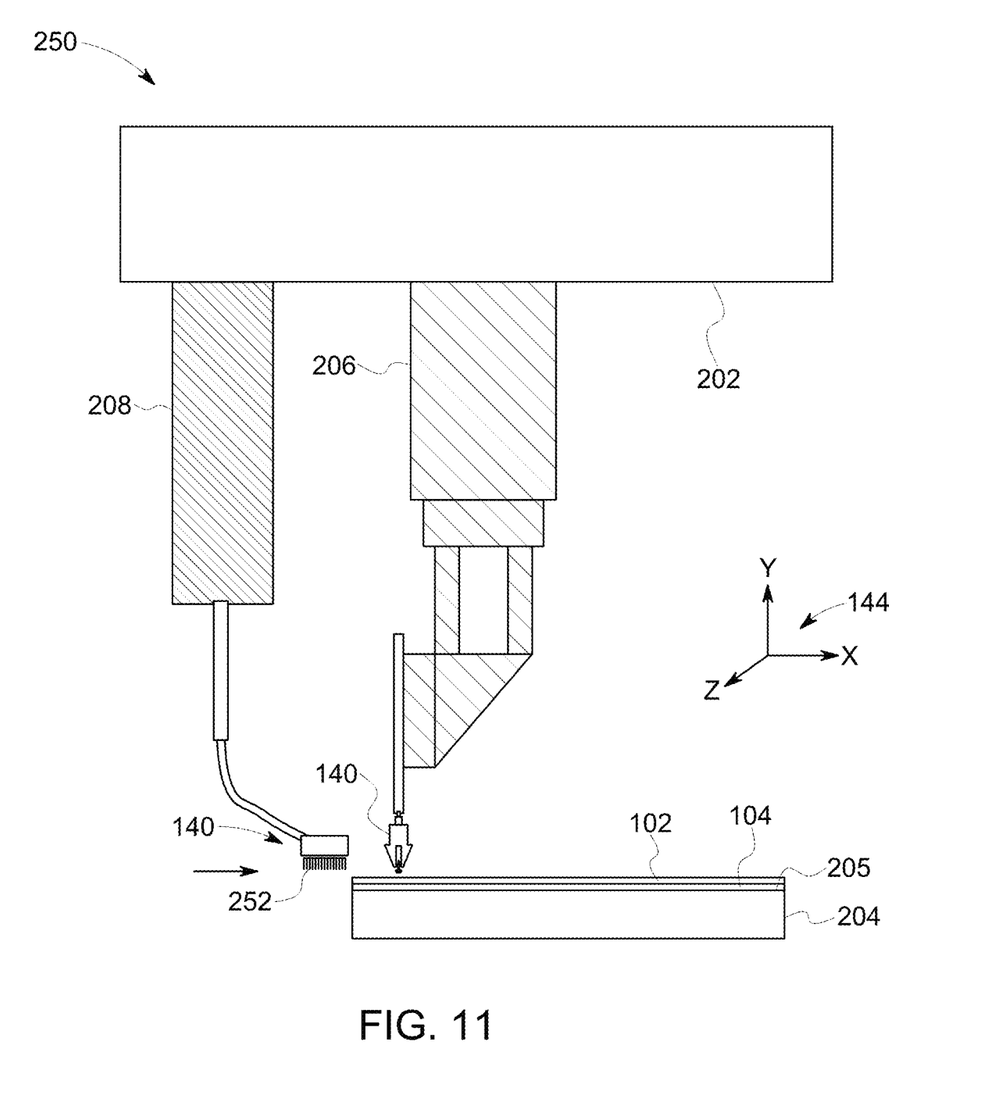
FIG. 11 is a simplified cross-sectional view of another embodiment of a system for removal of a layer, in accordance with one or more embodiments shown or described herein.
Figure 12:
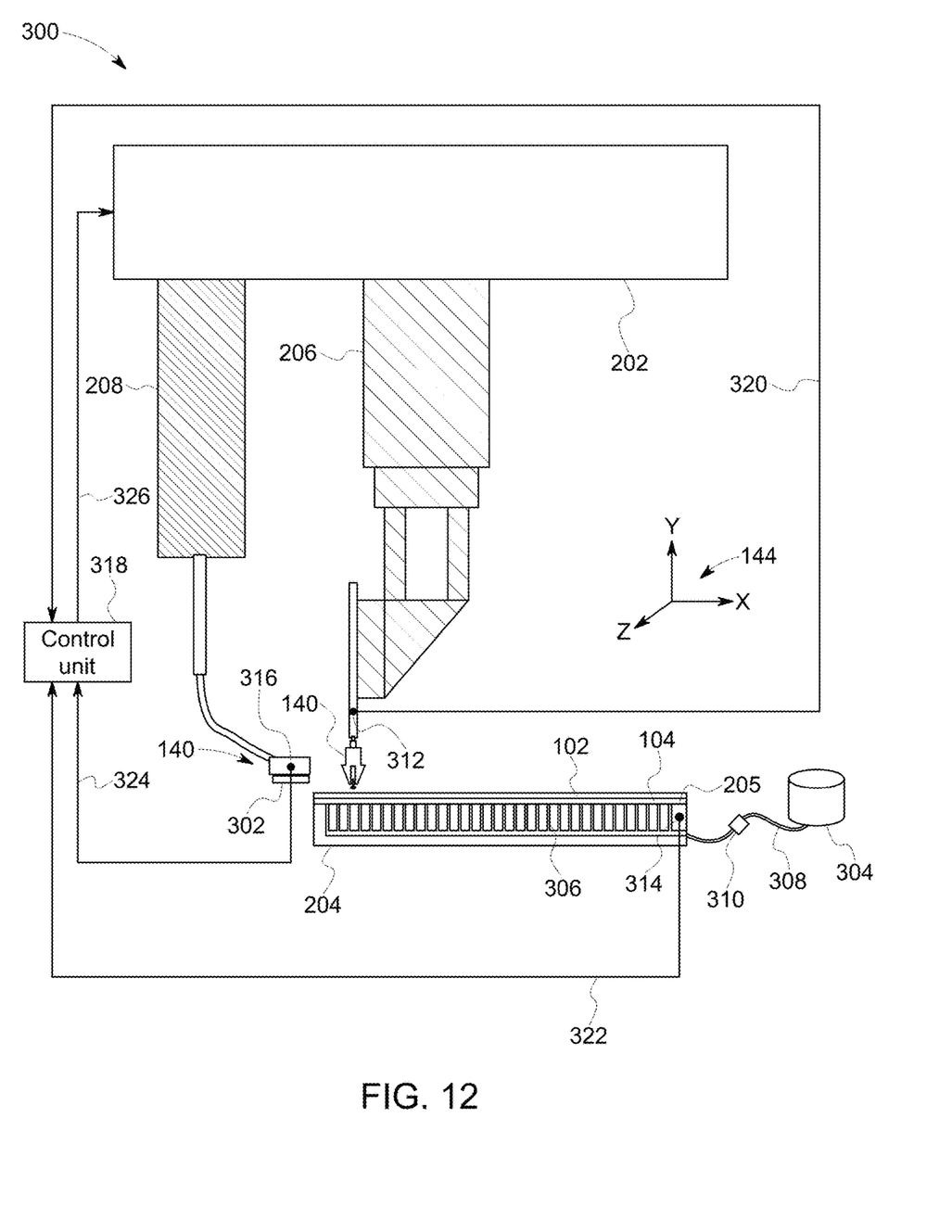
FIG. 12 is a simplified cross-sectional view of another embodiment of a system for removal of a layer, in accordance with one or more embodiments shown or described herein.
Figure 13:
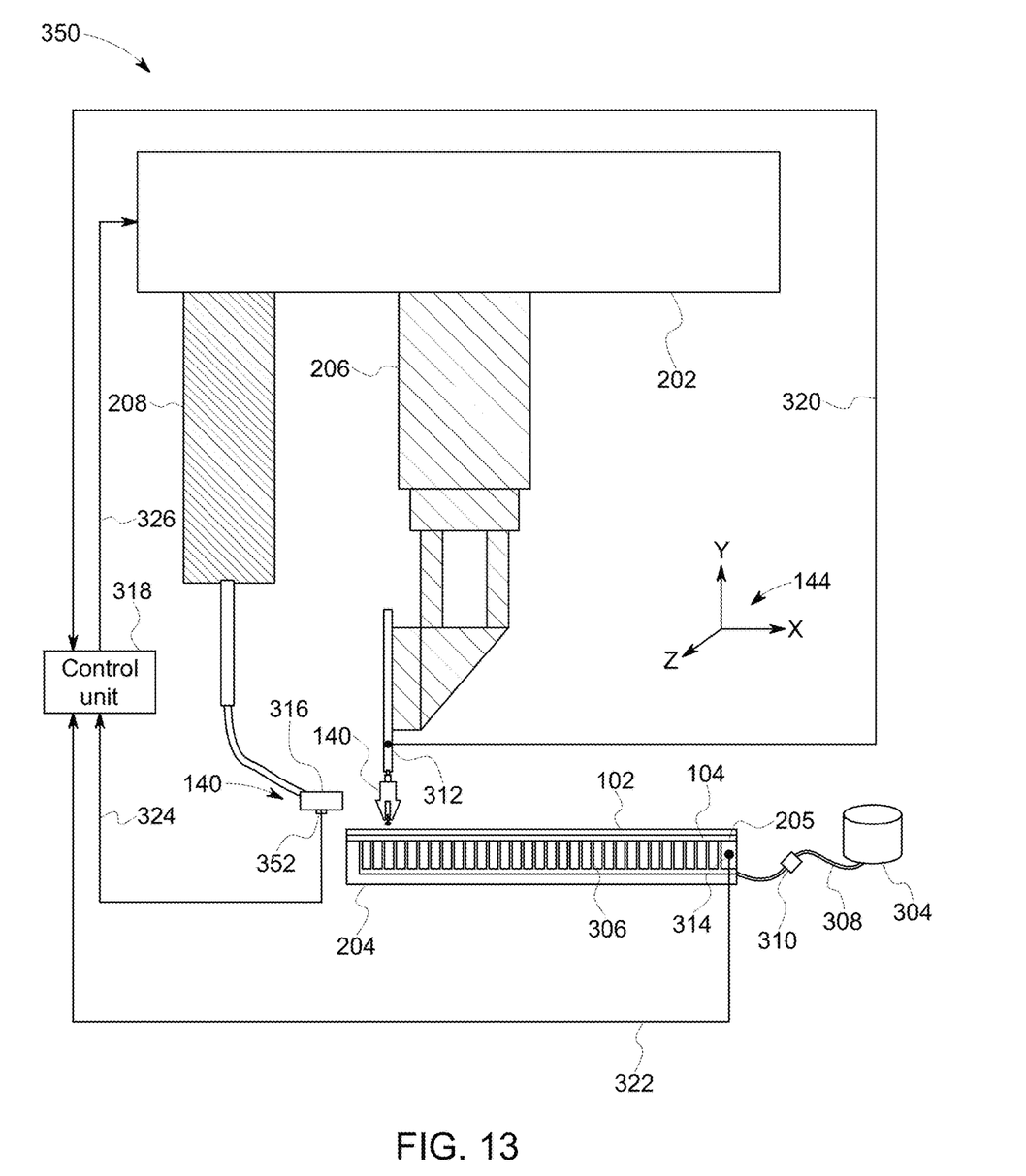
FIG. 13 is a simplified cross-sectional view of another embodiment of a system for removal of a layer, in accordance with one or more embodiments shown or described herein.

Referring now to the drawings, it is noted that like numerals refer to like elements throughout the several views and that the elements shown in the Figures are not drawn to scale and no dimensions should be inferred from relative sizes and distances illustrated in the Figures. Illustrated in FIG. 1 is a plurality of layers in accordance with one exemplary embodiment. FIG. 2 is an illustration of pressure sensitive adhesive dispensing system for use in the system and method for removal of a layer. FIGS. 3-8 are illustrations of the steps in a method for removal of a layer, in accordance with one or more embodiments. FIGS. 9 and 10 are simplified cross-sectional views of a system for removal of a layer prior to separation of a sacrificial corner portion from a remaining portion of the first layer, in accordance with one exemplary embodiment. FIGS. 11 and 12 are simplified cross-sectional views of additional embodiments of a system for removal of a layer. FIG. 13 is a flow chart of an exemplary method for removal of a layer, in accordance with one or more embodiments, as disclosed herein.

Certain embodiments of the present disclosure disclose a system and method for removing a first layer from one or more remaining layers of a plurality of layers. More specifically, certain embodiments of the present disclosure disclose a system and method for removing a protective layer adhered to a base fabric material. In certain other embodiments, the base fabric material is sandwiched between two protective layers. In certain other embodiments, the protective layer may be on one surface of the base fabric material. The system includes a gripper device, a cutting device, a support device, and at least one drive unit. The at least one drive unit is used for driving one or more components of the system, such as the gripper device and the cutting device. The cutting device is used for separating a sacrificial corner portion from the remaining portion of the protective layer, and the gripper is used for holding a proxy having an adhesive adhered thereto, the adhesive in contact with the protective layer, that with movement of the gripper device provides for peeling of the protective layer, beginning at the point of separation of the sacrificial corner portion from the remaining protective layer and removing the protective layer from the base fabric material. Further, the support device is used to hold the base fabric, so as to prevent slippage of the base fabric material.

Referring now to the drawings, FIG. 1 illustrates a plurality of layers 100 in accordance with one exemplary embodiment. In the illustrated embodiment, the plurality of layers 100 includes a first layer 102 and a second layer 104. The number of layers depicted in FIG. 1 is for illustration purpose only and number of layers may vary based on the application. In one embodiment, the first layer 102 and second layer 104 are adhered to each other. In some embodiments, the plurality of layers 100 may include composite plies, adhesive plies, or the like. The plurality of layers 100 may have a flat, contoured or other geometric surface. The composite plies may include prepregs with any fiber and any resin, or dry fabric with any fiber either tackified or not tackified. Other materials for the plies may include cores such as foam, metals, honeycomb, bagging materials, peel plies, release films, bleeders, breathers, bagging film, and other suitable materials. The materials listed herein may be used for composite manufacturing application, for example, a composite laminate. In certain embodiments, the first layer 102 may be a protective backing paper and the second layer 104 may be a base fabric, which is impregnated with a thermosetting resin. In some embodiments, the second layer 104 may be sandwiched between two first layers 102. In some embodiments, the first layer 102 may be a protective layer for any number of additional layers of a plurality of layers. Various other materials are also envisioned, and the materials listed above should not be construed as a limitation of the present invention.

In the illustrated embodiment, the first layer 102 includes an edge portion 106a formed proximate intersecting sides 108, 110. In certain other embodiments, the edge portion of the first layer 102 may be referred to 106b, 106c, 106d formed proximate the corresponding intersecting sides 108, 110, 112, 114 of the first layer 102. The illustrated edge portion 106a is used for explaining the embodiments of the disclosure and should not be construed as a limitation of the present technique. In the illustrated embodiment, the first layer 102 and the second layer 104 have a rectangular shape. It should be noted herein that the shape, size and number of the layers may vary depending on the application.

FIG. 2 illustrates an adhesive system 120, and more particularly a commercially available glue-dot system, for use in the system and method for removing a layer as disclosed herein. The adhesive system 120 as illustrated is generally comprised of a supply 122 of a plurality of pressure sensitive adhesives 124 releasably adhered to a tape 125 and a dispenser 126. Although shown as generally circular or dot-like in shape, the pressure sensitive adhesives 124 may be of any variety of shapes and/or patterns that provide for use in the system and method for removing a layer as disclosed herein. The pressure sensitive adhesives 124 are double-sided adhesives that bond instantly under pressure to most clean, dry surfaces. In the system and method for removing a layer as disclosed herein, the pressure sensitive adhesives 124 are of high-tack quality, so as to firmly adhere to the proxy and first layer 102, and hold firmly the first layer 102 during removal, as described presently. One such commercially available pressure sensitive adhesive, or glue-dot, system available for use is Sprintis® Silicone adhesive points or glue dots, ø=8-10 mm.

Figure 3:
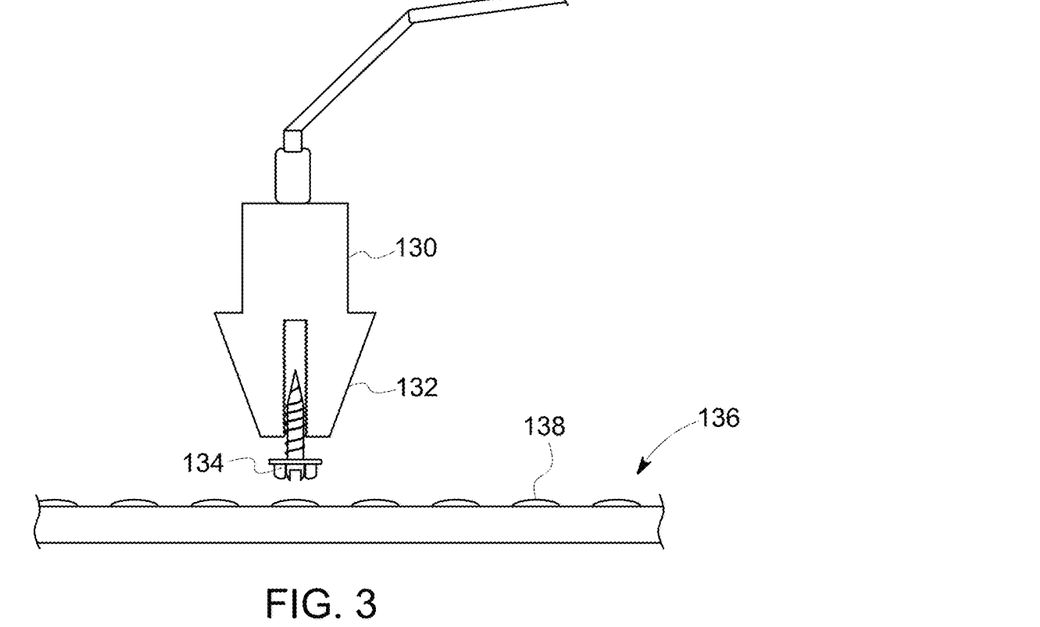
FIG. 3 is an illustration of a step in a method for removal of a layer, in accordance with one or more embodiments shown or described herein.

Referring now to FIGS. 3-8, illustrated are a plurality of steps in a method of removing the first layer 102 from one or more remaining layers of the plurality of layers, and more specifically the second layer 104 (illustrated in FIG. 1) in accordance with one exemplary embodiment. In the illustrated embodiments, the disclosed system and method of removing a layer utilize automation technology, such as classic robotic automated "pick and place" robotics. In alternate embodiment, alternative automation means may be used, as well as non-automated means. Referring more specifically to FIG. 3, illustrated is a gripper device 130. In one embodiment, the gripper device 130 has a plier shape and is designed to clamp an object therein. In certain other embodiments, the gripper device 130 may have a needle shape or a forceps shape depending on the application need and design criteria. Various other shapes of the gripper device 130 are also envisioned without limiting the scope of the present technique. As illustrated, the gripper device 130 has grasped between a plurality of gripping arms 132, a disposable proxy 134. In this particular embodiment, the disposable proxy 134 is in the shape of a readily available screw component. In alternate embodiments, the disposable proxy 134 may be any type of disposable or non-disposable component, formed of a metal, plastic, composite material, or the like, that allows for grasping between the gripping arms 132 of the gripper device 130. In the illustrated embodiment, the disposable proxy 134 is comprised of a plastic. During an automated process, the gripper device 130 is initially caused to grip the disposable proxy 134 within the gripper arms 132. It is noted that the disposable proxy 134 may be provided in an automated feed system in which the disposable proxy 134 is positioned in a manner to provide for gripping by the gripping device 130.

Figure 4:
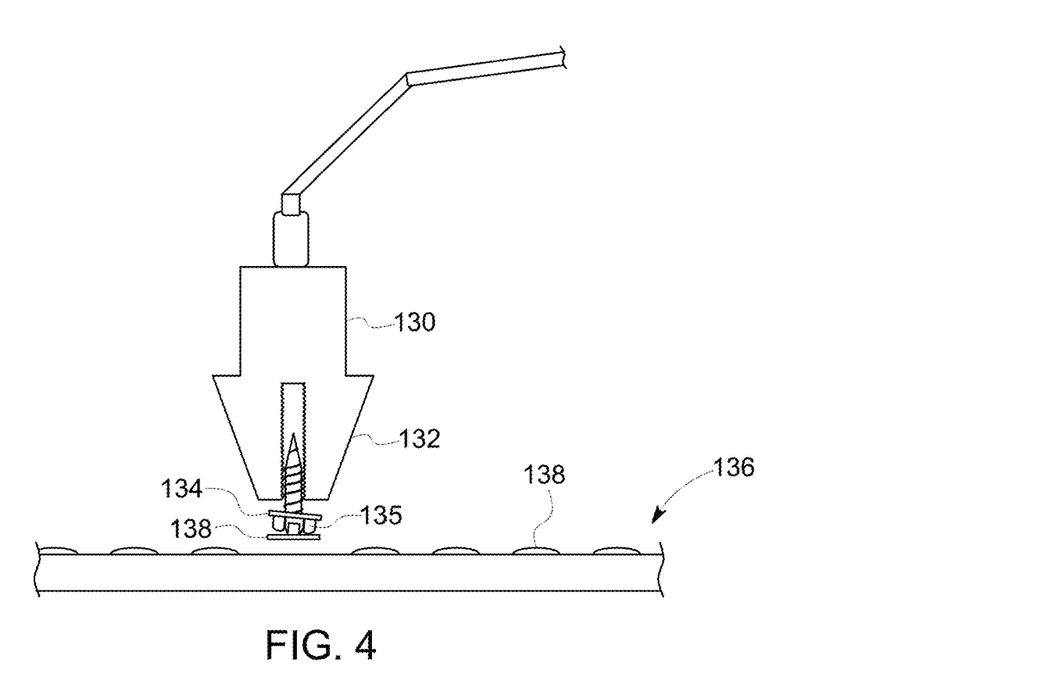
FIG. 4 is an illustration of a step in a method for removal of a layer, in accordance with one or more embodiments shown or described herein.

Next, as best illustrated in FIG. 4, the gripping device 130 is positioned relative to an adhesive dispensing system 136 capable of dispensing one or more pressure sensitive adhesives 138, such as adhesive system 120 and the adhesives 124 of FIG. 2. The gripping device 130 is moved in a manner along at least one axis so as to exert sufficient pressure to adhere the pressure sensitive adhesive 138 to an end 135 of the disposable proxy 134, as illustrated. The gripping device 130 is then moved in a manner along at least one axis so as to remove the pressure sensitive adhesive 138 from the adhesive dispensing system 136, leaving it adhered to the disposable proxy 134.

Figure 5:
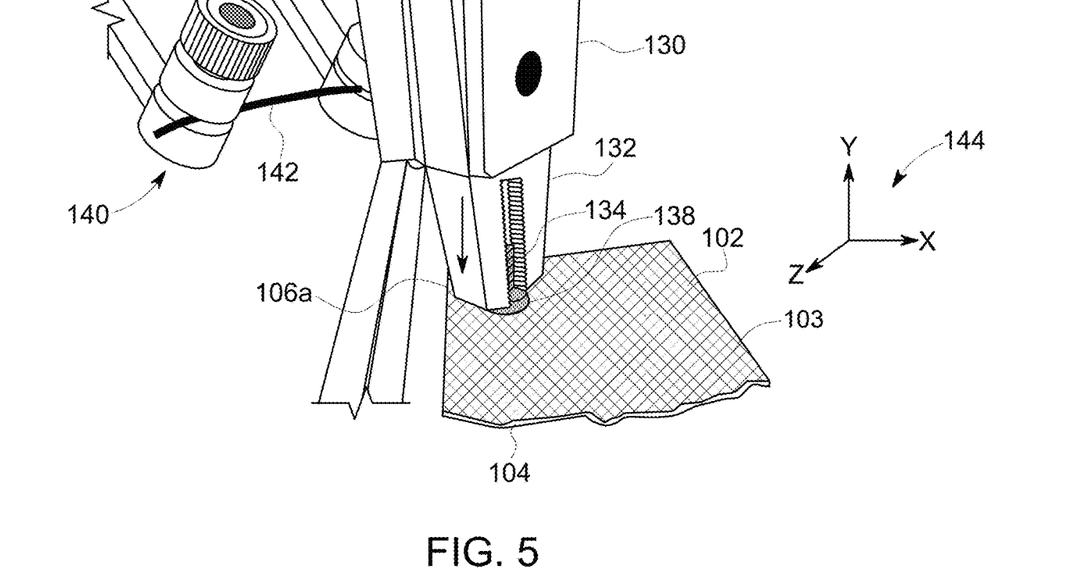
FIG. 5 is an illustration of a step in a method for removal of a layer, in accordance with one or more embodiments shown or described herein.
Figure 6:
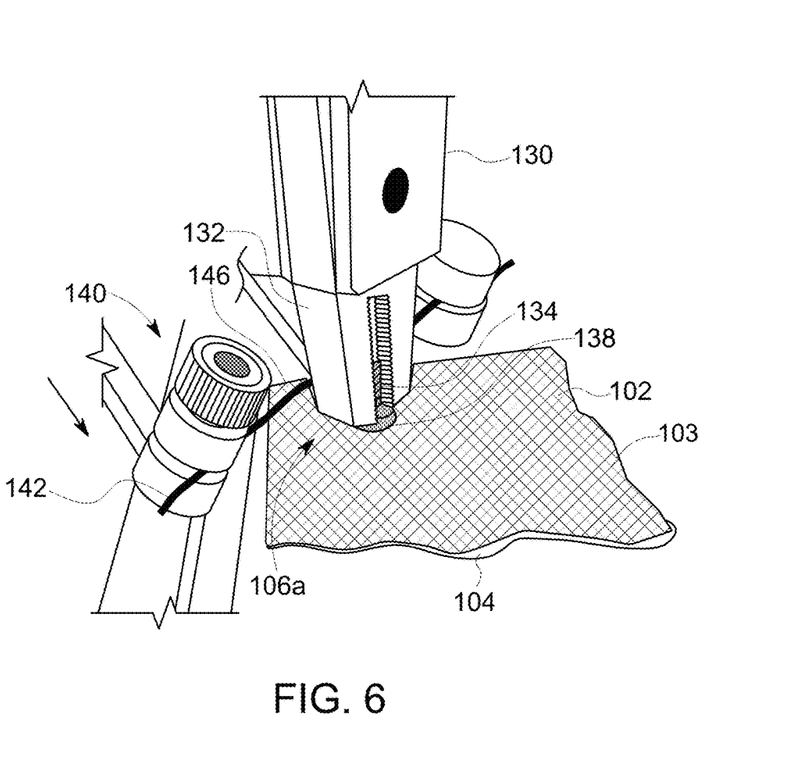
FIG. 6 is an illustration of a step in a method for removal of a layer, in accordance with one or more embodiments shown or described herein.

Referring now to FIGS. 5-8, the gripper device 130 is next positioned relative to the plurality of layers 100, such as a prepreg material, for removing the first layer 102 from the one or more remaining layers of the plurality of layers 100. In the illustrated embodiment, the plurality of layers 100 comprise the first layer 102 and the second layer 104. Accordingly, the gripper device 130 is positioned relative to the plurality of layers 100, for removing the first layer 102 from the second layer 104, in accordance with one exemplary embodiment. In an embodiment, the plurality of layers 100 are held down on a support device by either vacuum or some other means (described presently). Referring more specifically to FIG. 5, as illustrated, by directional arrow, the gripper device 130 is moved along one or more axis so as to adhere the pressure sensitive adhesive 138, presently having one side adhered to the disposable proxy 134, to the first layer 102 proximate the edge portion 106a. In an alternate embodiment, the pressure sensitive adhesive 138 can be adhered to the first layer 102 at another location, but it is envisioned to be applied near a corner/edge of the first layer 102, such as edge portion 106a, where the adhesion forces are lowest. A cutting device 140 is next positioned proximate the plurality of layers 100 and configured to provide a cutting force. In this particular embodiment, the cutting device 140 is a resistive wire 142 that is heated in response to a current flowing therethrough, and capable of exerting a cutting force, such as a pressure force, on the first layer 102, proximate the edge portion 106a, so as to cut through the first layer 102. More specifically, as best illustrated in FIG. 6, subsequent to heating, the resistive wire 142 is moved along one or more axis 144, as indicated by directional arrow, so as to contact the first layer 102, thereby melting and/or cutting through the first layer 102 so as to separate a sacrificial corner portion 146 of the first layer 102, proximate the edge portion 106a, from a remaining portion 103 of the first layer 102, and in particular, that portion of first layer 102 having the disposable proxy 134 adhered thereto via the pressure sensitive adhesive 138. In alternate embodiments, the cutting device 140 may be configured to include a guillotine-like knife edge (described presently) or a plurality of needle-like projections (described presently).

Figure 7:
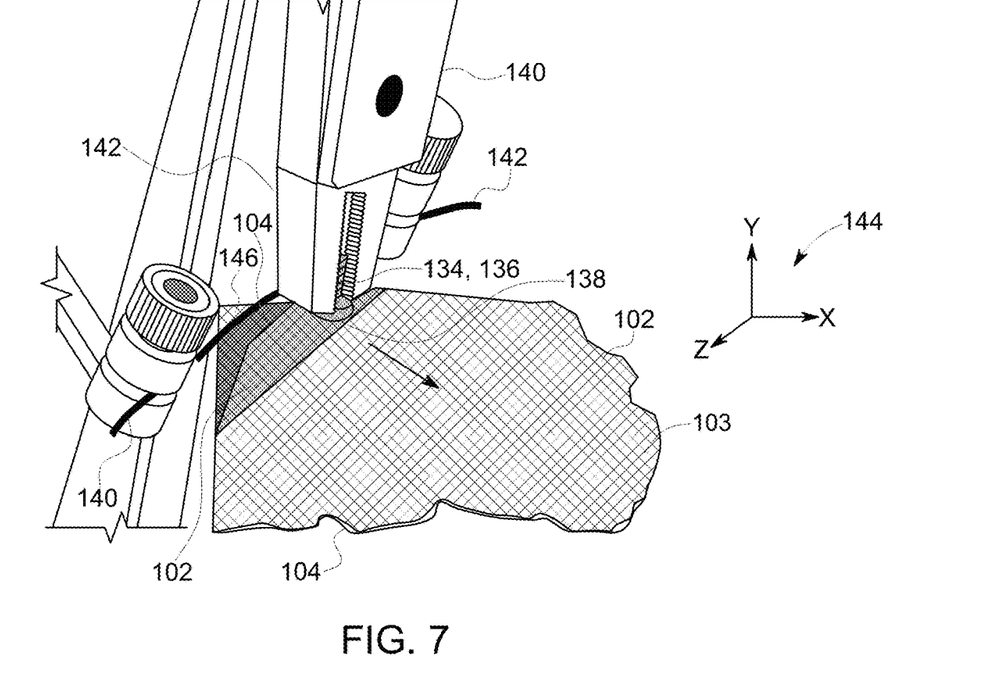
FIG. 7 is an illustration of a step in a method for removal of a layer, in accordance with one or more embodiments shown or described herein.
Figure 8:
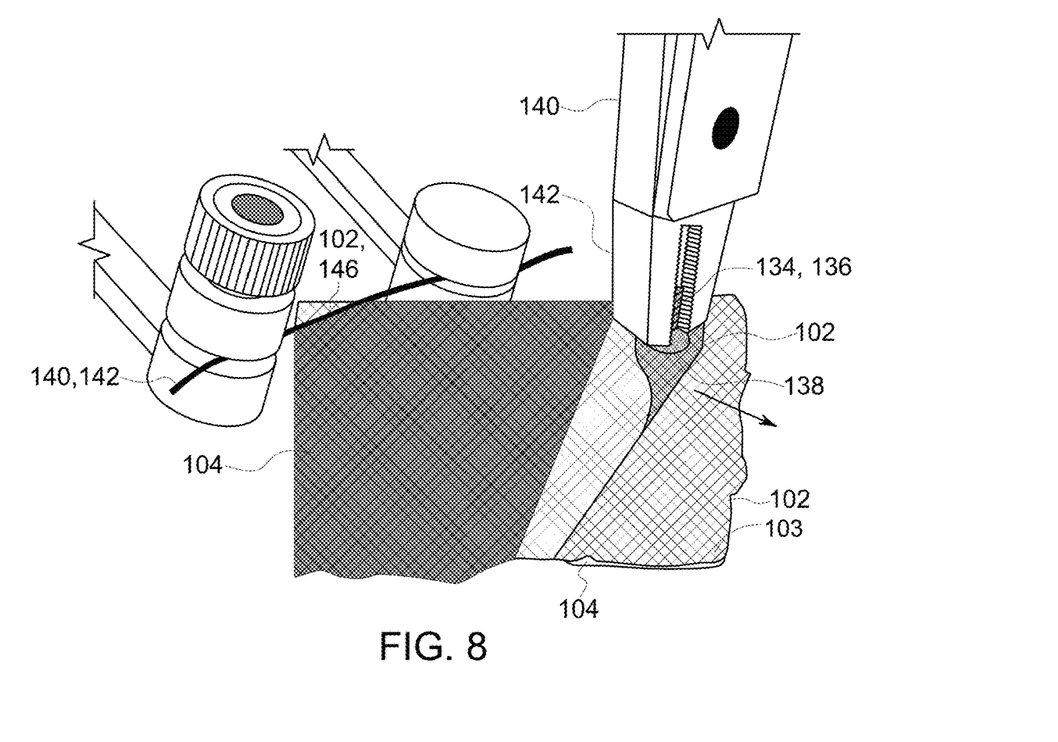
FIG. 8 is an illustration of a step in a method for removal of a layer, in accordance with one or more embodiments shown or described herein.

Referring now to FIGS. 7 and 8, subsequent to separating the sacrificial corner portion 146 of the first layer 102, from the remaining portion 103 of the first layer 102, the robotic gripper device 130 executes a pulling (or semi-rolling) motion so the remaining portion 103 of the first layer 102 is separated from the second layer 104. By continuing the pulling motion, the remaining portion 103 of the first layer 102 will be entirely removed, leaving only the sacrificial corner portion 146 of the first layer 102 adhered to the second layer 104. In one embodiment, the gripper device 130 is movable towards and away from the first layer 102, along a direction represented by the directional arrow, to peel the remaining portion 103 of the first layer 102 from the second layer 104. In one embodiment, the gripper device 130 may peel the remaining portion 103 of the first layer 102 from the second layer 104 in a single stroke movement. In some other embodiments, the gripper device 130 may undergo a plurality of strokes, until the remaining portion 103 of the first layer 102 is peeled from the second layer 104. The gripper device 130 is driven by a drive unit (described presently) so as to move at a speed to enable peeling of the first layer 102 from the second layer 104. Finally, the automated system moves the gripper device 130 to a location where the disposable material is collected (not shown). The gripper device 130 is caused to release the proxy device 134, so both the removed first layer 102 and the proxy device 134 are properly disposed. If separation of the first and second layers 102, 104 is unsuccessful, the process can be repeated with a new proxy device 134 and pressure-sensitive adhesive 138.

FIGS. 9-12 illustrates various embodiments of a system 200 used for removing the first layer 102 from the second layer 104 (illustrated in FIG. 1) in accordance with exemplary embodiments disclosed herein. In the illustrated embodiment of FIGS. 9 and 10, the system 200 includes a drive unit 202, a gripper device 130, a cutting device 140 and a support device 204. A vacuum source (described presently) may be coupled to the support device 204, for applying a vacuum force against the plurality of layers 100 (FIG. 1) discussed in greater detail below. In other embodiments, the support device 204 may be a sticky device or include some other means for holding down the plurality of layers 100.

In the illustrated embodiments, the support device 204 has a rectangular shape. The shape of the support device 204 may vary depending on the application and design criteria. Accordingly, various other shapes of the support device 204 are also envisioned. In an embodiment, a support surface 205 of the support device 204 may be at least one of a sticky surface and a non-sticky surface. In one specific embodiment the support surface 205 may be a mold. In one embodiment, the support surface 205 of the support device 204 may be a sticky surface for affixing the second layer 104 to the support surface 205. In such embodiments, the second layer 104 is a base fabric. In certain embodiments, affixing materials may not be required for sticking the second layer 104 to the support surface 205. The second layer 104 may be automatically fixed to the support surface 205. Various other means of affixing the second layer 104 on the support surface 205 may also be used, such as a vacuum force, described presently. In some embodiments, the support device 204 may be an end-product (also referenced as an "off-the-shelf product") having the support surface 205 over which the second layer 104 among of the plurality of layers 100 is affixed.

In the illustrated embodiment, the drive unit 202 includes one or more driving means, which as per one embodiment may include at least one of a spring loaded unit 202a, a drive cylinder unit 202b, a robot unit 202c, a drive motor unit 202d, a gear drive unit 202e, a gantry unit 202f, a pneumatic unit 202g, and any additional components required to operate the system and method of removing a layer as disclosed herein. The drive unit 202 is configured to move at least one of the cutting device 140 and the gripper device 130 independently or simultaneously. In an embodiment, the support device may be driven by an additional drive unit, similar to the illustrated drive unit 202. In another embodiment, the support device may be stationary. In certain embodiments, the drive unit 202 may be a portable unit, and gripper device 130, the cutting device 140 and the support device 204 may be plugged to the portable unit based on the application need.

The drive unit 202 includes a first end effector arm 206 for independently moving the gripper device 130. Similarly, the drive unit 202 includes another first end effector arm 208 for independently moving the cutting device 140. In one embodiment, the drive unit 202 moves the gripper device 130 along at least one axis 144. It should be noted herein that the gripper device 130 and the cutting device 140 may be mounted in any position. For example, the gripper device 130 and the cutting device 140 may be mounted vertically or at a predefined tilted angle. In the illustrated embodiment, the gripper device 130 may be movable along a plurality of axes 144, for example, an x-axis, y-axis, and z-axis, for contacting the first layer 102 and also for retracting from the first layer 102. The axis is determined based on the application and may vary depending on the need of the application and design criteria. Similarly, the drive unit 202 may move the cutting device 140 along a plurality of axes 144, for example, an x-axis, y-axis, and z-axis, for contacting the first layer 102 and also for retracting from the first layer 102. The axis is determined based on the application and may vary depending on the need of the application and design criteria. In such embodiments, each of the gripper device 130 and the cutting device 140 may be movable along the at least one axis among the plurality of axes for contacting the first layer 102 and also for retracting from the first layer 102. In one embodiment, the drive unit 202 moves the gripper device 130 along the plurality of axes 144, for enabling peeling of the first layer 102 from the second layer 104. Similarly, the cutting device 140 may move towards and away from the edge portion 106 of the first layer 102 along one or more axes 144 to enable separation of the sacrificial corner edge portion 146 of the first layer 102 from the remaining portion 103 of the first layer 102.

In one example, the robot unit 202c of the drive unit 202 may be used in conjunction with the pneumatic unit 202g as a supplementary driving unit. In certain embodiments, the drive unit 202 is configured to operate at a speed. The speed at which the drive unit 202 operates may be varied, and may be determined based on the type of material of the plurality of layers 100. The configuration and speed of operation of the drive unit 202 may vary depending on the application, the material of the plurality of layers, number of layers, and design criteria.

In the illustrated embodiment, the gripper device 130 is coupled to the first end effector arm 206 of the drive unit 202. In some other embodiments, the gripper device 130 may be operated independently of the drive unit 202. The gripper device 130 is actuated so as to grasp the disposable proxy 134 in the gripper arms. The gripper device 1300 is initially actuated to grasp the disposable proxy 134 and then apply a pressure force to a pressure sensitive adhesive 138 (FIG. 2), so as to adhere the pressure sensitive adhesive 138 to the disposable proxy 134. The gripper device 130 is then further actuated to adhere the pressure sensitive adhesive 138 to the first layer 102, as previously described, and as illustrated in FIGS. 5 and 9. The cutting device 130 is then moved proximate the plurality of layers 100, as illustrated in FIG. 10, so as to enable separation of the sacrificial corner portion 146 (FIGS. 6-8) of the first layer 102, from the remainder of the first layer 102 and enable removing of a remaining portion 103 of the first layer 102, from the second layer 104.

Referring now to FIG. 11, illustrated is another embodiment of the system for removing a layer, referenced 250. It is again noted, that like elements have like numbers throughout the various embodiments. In contrast to the embodiment of FIGS. 9 and 10, in this particular embodiment, the cutting device 140 includes a plurality of needle-like projections 252. Similar to the previous embodiment, the cutting device 140 is moved along one or more axes 144 so as to allow the needle-like projections 252 to exert a cutting force through the first layer 102, and more particularly to be pressed onto, and through the first layer 102, proximate the edge portion 106a. The pressing of the needle-like projections 252 onto and through the first layer 102 provides a perforation proximate the edge portion 106a to define the sacrificial corner portion 146 (FIGS. 6-8) that allows for the remainder of the first layer 102 to be peeled away as in the previous embodiment. It should be noted that the drive unit 202 as illustrated, is configured to include one or more of the driving means previously described.

Referring now to FIG. 12, illustrated is another embodiment of the system for removing a layer, referenced 300. It is again noted, that like elements have like numbers throughout the various embodiments. In contrast to the embodiment of FIGS. 9-11, in this particular embodiment, the cutting device 140 includes a guillotine-like knife edge 302. Similar to the previous embodiments, the cutting device 140 is moved along one or more axes 144 so as to allow the guillotine-like knife edge 302 to exert a cutting force through the first layer 102, and more particularly to be pressed onto, and through the first layer 102, proximate the edge portion 106a, to separate a sacrificial corner portion 146 (FIGS. 6-8). The pressing of the guillotine-like knife edge 302 onto and through the first layer 102 provides a cut proximate the edge portion 106a that allows for the remainder of the first layer 102 to be peeled away from the sacrificial corner portion 146 as in the previous embodiments. Again, it should be noted that the drive unit 202 as illustrated in FIG. 12, is configured to include one or more of the driving means previously described.

In the embodiment of FIG. 12, the system 300 further includes a vacuum source for securing the plurality of layers 100 to the support device 204. In addition, a blowing source may be included to aid in lifting or removing the plurality of layers from the support device 204. More particularly, in the illustrated embodiment of FIG. 12, a vacuum source 304 is provided for applying a suction force, via a plurality of holes 306 in the support device 204, to the support surface 205 and against the second layer 104 disposed on the support surface 205 of the support device 204 for properly holding the second layer 104 against the support surface 205. In yet another alternate embodiment, the system may include a fluid blower (not shown) for providing a blowing fluid to the support surface 205 to enable easy lifting or removal of the second layer 104 from the support surface 205. The fluid may include air or other gaseous medium or liquid depending on the type of material of the plurality of layers 100, application, and design criteria. The vacuum source 304 is coupled to the support device 204 via a channel 308. A control valve 310 is provided for controlling flow through the channel 308.

In one embodiment, each hole among the plurality of holes 306 may have a diameter of 1 mm. In some other embodiments, the plurality of holes 306 may have a different size depending on the application and design criteria. In one embodiment, the suction force or holding force through each hole 306 can be individually controlled. In one embodiment, the vacuum device 308 has a suction holding force sufficient to provide smooth peeling of the first layer 102, while preventing the second layer 104 from lifting off from the support device 204.

In the illustrated embodiments, the plurality of layers 100 are placed on the support surface 205 of the support device 204. The second layer 104 of the plurality of layers 100 is held by the support surface 205, as described previously. The drive unit 202 moves the gripper device 130 via the first end effector arm 206, and the cutting device 140 via a first end effector arm 208 of the drive unit 202. In the embodiment of FIG. 12 the system further includes a plurality of sensors 312, 314, 316 and a control unit 318. In one embodiment, the sensor 312 is a contact sensor, which may sense the contacting of the pressure sensitive adhesive 138 adhered to the disposable proxy 134 with the first layer 102 based on touch, or the like. In some other embodiments, the sensor 312 may be a vision sensor, which may sense the contacting of the pressure sensitive adhesive 138 on the disposable proxy 134 with the first layer 102 based on vision, or the like. Similarly, the sensor 314 may be used for sensing at least one of contacting of the second layer 104 by the support surface 205 of the support device 204, the position of the second layer 104 on the support surface 205, and removal of the first layer 102 entirely from the second layer 104. Further, the sensor 316 is provided for sensing the contacting of the cutting device 130 with the edge portion 106a of the first layer 102, and contact of the cutting device 130 with the second layer 104 subsequent to cutting therethrough the first layer 102. The number of sensors and their relative positions may vary depending on the application.

In the illustrated embodiment of FIG. 12, the plurality of sensors 312, 314, 316 generate output signals 320, 322, 324, respectively. The control unit 318 is communicatively coupled to the plurality of sensors 312, 314, 316 for receiving the generated output signals 320, 322, 324. It should be noted herein that the term "communicatively coupled" may either be referred to a wired communication or a wireless communication. In one embodiment, the control unit 318 is configured for generating a control signal 326 for controlling the drive unit 202 based on the output signals 320, 322, 324. In one embodiment, the control unit 318 outputs the control signal 326 to the drive unit 202 for actuating the gripper device 130 to move the gripper device 130 in any one of the plurality of axes 144, and thus the peeled portion of the first layer 102, based on the output signal 320. Similarly, in one embodiment, the control unit 318 outputs the control signal 326 to the drive unit 202 to control the movement of first end effector arms 206, 208, for relative movement in any one of the plurality of axes 144 and positioning of the gripper device 130, and the cutting device 140, respectively. Also, in some embodiments, the control signal 326 is used to activate the support device 204 for injecting a fluid via a fluid blower (not shown) to release the second layer 104 from the support surface 205. In some embodiments, the control signal 326 may be used for generating an alarm signal (not illustrated in FIG. 12) for positioning of the second layer 104 on the support surface 302. Additionally, the control unit 318 outputs the control signal 326 to the drive unit 202 for actuating the first end effector arm 206 of the drive unit 202 to move the gripper device 130 in any one of the plurality of axes 144 for removing the first layer 102 entirely from the second layer 104 based on the output signal 322.

Referring now to FIG. 13, illustrated is another embodiment of the system for removing a layer, referenced 350. It is again noted, that like elements have like numbers throughout the various embodiments. In contrast to the embodiment of FIGS. 9-12, in this particular embodiment, the cutting device 140 includes a laser 352. Similar to the previous embodiments, the cutting device 140 is moved along one or more axes 144 so as to allow the laser 352 exert a cutting force through the first layer 102, and more particularly to be projected onto the first layer 102, and provide cutting through the first layer 102, proximate the edge portion 106*a*, to separate a sacrificial corner portion 146 (FIGS. 6-8). The projecting of the laser 352 onto and through the first layer 102 provides a cut proximate the edge portion 106*a* that allows for the remainder of the first layer 102 to be peeled away from the sacrificial corner portion 146 as in the previous embodiments. Again, it should be noted that the drive unit 202 as illustrated in FIG. 13, is configured to include one or more of the driving means previously described.

Figure 14:
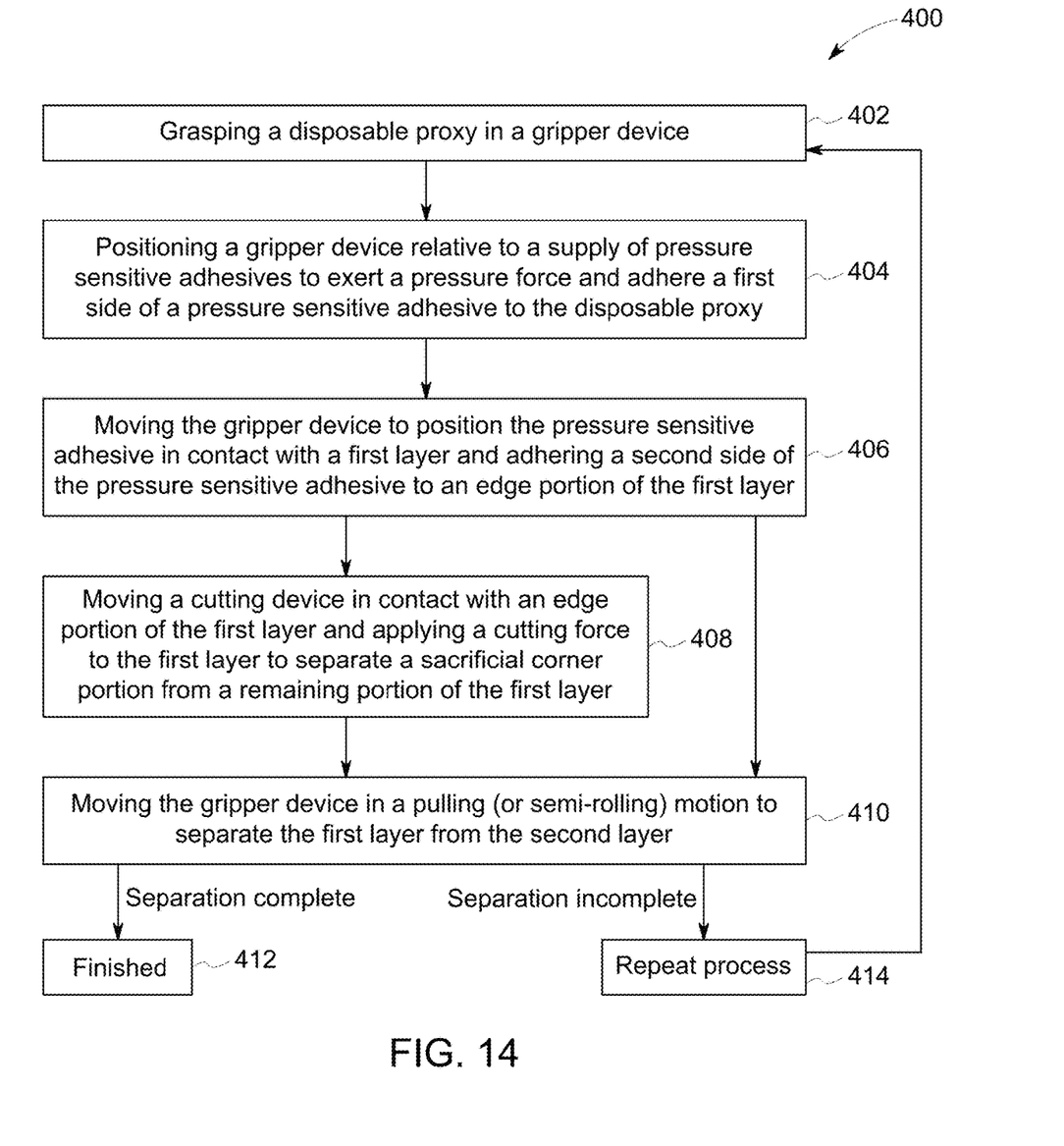
FIG. 14 is a flow chart of an exemplary method for removal of a layer, in accordance with one or more embodiments shown or described herein.

Referring now to FIG. 14, illustrated is a flow chart of a method 400 of removing a layer (shown in FIG. 1). With reference to FIGS. 3-13, the method 400 of FIG. 14 generally includes grasping a disposable proxy 134 in a gripper device 130, in a step 402. Next, the method includes positioning the gripper device 130 relative to a supply of pressure-sensitive adhesives 138 and moving the gripper device 130 to exert a pressure force on a pressure sensitive adhesive 138, causing the pressure sensitive adhesive 138 to adhere to the disposable proxy 134, in a step 404. The gripper device 130 is next moved so as to position the pressure sensitive adhesive 138 in contact with the first layer 102 to be removed, in a step 406. In a step 408, a cutting device 140 is positioned relative to an edge portion 106*a* of the first layer to cut through the first layer 102 to separate a sacrificial corner portion 146 from a remaining portion 103 of the first layer 102.

Subsequent to separation of the sacrificial corner portion 146 from the remaining portion 103 of the first layer 102, the gripper device 130 executes a pulling (or semi-rolling) motion so the remaining portion 103 of the first layer 102 is completely separated from the second layer 104, in a step 410. By continuing the pulling motion, the remaining portion 103 of the first layer 102 will be removed, leaving the sacrificial corner portion 146 of the first layer 102 adhered to the second layer 104. If complete separation of the first layer 102 from the second layer 104 is achieved, the process is complete, as indicated at 412. If separation of the first and second layers 102, 104 is unsuccessful, the process can be repeated, in a step 414, with a new proxy device and pressure-sensitive adhesive 138.

Embodiments of the present disclosure discussed herein enable repetitive and reliable removal of protective layers from a composite layer stack, and have the capability to remove various types of protective layers only by varying the motion of the drive unit. No damage is caused to the underlying material. Other advantages include labor savings, increased productivity, and improved quality through automation.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While certain features have been illustrated and described herein, many modifications and changes will occur by those skilled in the art. It is, therefore, to be understood that the appended claims are intended to cover all such modifications and changes as fall within the true spirit of the invention.

The invention claimed is:

1. A system comprising:
a gripper device configured to grasp a disposable proxy, wherein the gripper device is moveable to position a pressure sensitive adhesive in contact with the disposable proxy and apply a pressure force to adhere the pressure sensitive adhesive to the disposable proxy and remove the pressure sensitive adhesive from a dispenser, and wherein the gripper device is moveable to position the pressure sensitive adhesive in contact with an edge portion of a first layer of a plurality of layers and apply a pressure force to adhere the pressure sensitive adhesive to the edge portion of the first layer;
a cutting device moveable along one or more axis to contact the first layer and apply a cutting force to the first layer proximate the edge portion of the first layer to define a sacrificial corner portion of the first layer proximate the edge portion of the first layer from a remaining portion of the first layer;
a support device, wherein the plurality of layers are held by a support surface of the support device;
wherein the gripper device is movable to peel the remaining portion of the first layer entirely from the one or more remaining layers of the plurality of layers.

2. The system of claim 1, wherein the system is an automated robotic system.

3. The system of claim 1, wherein the cutting device comprises at least one of a resistive wire, guillotine knife edge, a plurality of needle-like projections and a laser.

4. The system of claim 1, wherein the disposable proxy is a screw shaped component.

5. The system of claim 1, wherein the support surface of the support device is at least one of a sticky surface and a non-sticky surface.

6. The system of claim 1, wherein the support surface comprises a plurality of holes coupled to a vacuum source for applying a suction force at the support surface.

7. The system of claim 1, further comprising a drive unit, wherein the gripper device and the cutting device are coupled to the drive unit.

8. The system of claim 7, wherein the drive unit comprises at least one of a spring loaded unit, a drive motor unit, a drive cylinder unit, a gear drive unit, a pneumatic unit, a robot unit, and a gantry unit.

9. The system of claim 1, further comprising a plurality of sensors for sensing at least one of contacting of the first layer by the pressure sensitive adhesive in contact with the disposable proxy, contacting of the plurality of layers by the support surface of the support device, holding of a peeled first layer by the pressure sensitive adhesive in contact with the disposable proxy, and removal of the first layer entirely from the one or more remaining layers of the plurality of layers.

10. The system of claim 9, further comprising a control unit communicatively coupled to the plurality of sensors, and configured to control the drive unit based on output signals from the plurality of sensors.

11. The system of claim 10, wherein the control unit is further configured to independently control the gripper device and the cutting device.

12. A method comprising:
holding a plurality of layers by a support surface of a support device;
grasping a disposable proxy in a gripper device;
adhering a first side of a pressure sensitive adhesive to the disposable proxy;
adhering a second side of the pressure sensitive adhesive to an edge portion of a first layer of the plurality of layers;
applying a cutting force with a cutting device to separate a sacrificial corner portion of the first layer proximate the edge portion of the first layer from a remaining portion of the first layer; and
moving the gripper device to peel the remaining portion of the first layer entirely from one or more remaining layers of the plurality of layers.

13. The method of claim 12, further comprising sensing at least one of contacting of the first layer by the pressure sensitive adhesive adhered to the disposable proxy, contacting of the first layer by the cutting device, applying of the cutting force to the first layer to separate the sacrificial corner portion of the first layer from the remaining portion of the first layer, holding of the peeled remaining portion of the first layer by the pressure sensitive adhesive adhered to the disposable proxy gripped in the gripper device, and removal of the first layer entirely from the one or more remaining layers of the plurality of layers, via a plurality of sensors.

14. The method of claim 13, further comprising controlling a drive unit configured to drive the gripper device and the cutting device, via a control unit based on output signals from the plurality of sensors.

15. The method of claim 12, wherein applying a cutting force with a cutting device comprises applying a cutting force with at least one of a resistive wire, a guillotine knife edge, a plurality of needle-like projections and a laser.

16. The method of claim 12, further comprising applying a holding force against the plurality of layers through a plurality of holes in the support surface of the support device to hold the plurality of layers against the support surface of the support device.

17. A method comprising:
holding a plurality of layers by a support surface of a support device;
grasping a disposable proxy in a gripper device;
adhering a first side of a pressure sensitive adhesive to the disposable proxy;
adhering a second side of the pressure sensitive adhesive to an edge portion of a first layer of the plurality of layers;
applying a cutting force with a cutting device to separate a sacrificial corner portion of the first layer proximate the edge portion of the first layer from a remaining portion of the first layer;
moving the gripper device along at least one axis to peel the remaining portion of the first layer entirely from one or more remaining layers of the plurality of layers; and
sensing via a plurality of sensors at least one of contacting of the first layer by the pressure sensitive adhesive adhered to the disposable proxy, contacting of the first layer by the cutting device, applying of the cutting force to the first layer to separate the sacrificial corner portion of the first layer from the remaining portion of the first layer, holding of the peeled remaining portion of the first layer by the pressure sensitive adhesive adhered to the disposable proxy gripped in the gripper device, and removal of the first layer entirely from the one or more remaining layers of the plurality of layers.

18. The method of claim 17, further comprising controlling a drive unit configured to drive the gripper device and the cutting device, via a control unit based on output signals from the plurality of sensors.

19. The method of claim 17, wherein applying a cutting force with a cutting device comprises applying a cutting force with at least one of a resistive wire, a guillotine knife edge, a plurality of needle-like projections and a laser.

* * * * *